United States Patent

Dahlke

[11] Patent Number: 4,467,514
[45] Date of Patent: Aug. 28, 1984

[54] LOCATING ARRANGEMENT FOR BUILDING WIRING INSTALLATION

[76] Inventor: Charles Dahlke, 1505 N. Franklin Pl., Apt. 201, Milwaukee, Wis. 53202

[21] Appl. No.: 444,432

[22] Filed: Nov. 24, 1982

[51] Int. Cl.³ .................. B23Q 17/00; B65H 59/00
[52] U.S. Cl. .................. 29/407; 254/134.3 R
[58] Field of Search .................. 29/407, 433; 254/134.3 R, 134.3 FT; 339/217 S

[56] References Cited

U.S. PATENT DOCUMENTS

| | | | |
|---|---|---|---|
| 3,078,073 | 2/1963 | Zizzo | 254/134.3 R |
| 3,110,478 | 11/1963 | Bostick | 254/134.3 FT |
| 3,858,848 | 1/1975 | MacFetrich | 254/134.3 R |
| 3,971,543 | 7/1976 | Shanahan | 254/134.3 R |
| 3,995,931 | 12/1976 | Pienkowski | 339/217 S |

*Primary Examiner*—Mark Rosenbaum
*Assistant Examiner*—Steven E. Nichols

[57] ABSTRACT

A unique building wiring system is disclosed. When the building framework is completed and the studs and ceiling joists are exposed, the workman places a mark on the floor directly beneath where an electrical outlet box or the like is to be placed. The workman then drills a vertical hole in the horizontal top plate and directly above the floor mark. A visual locator tool is positioned in the hole so that it is hangingly supported by the top plate. The wall and ceiling panels may then be installed by other workmen. Subsequently, the electrician enters the closed crawlspace where he can easily find the locator by visual observation. He attaches his electrical wiring to the locator and releases the latter so that it drops down from the hole by gravity, carrying the wiring with it in a generally vertical line. The electrician then enters the room, finds the mark on the floor, measures up to where he wants the box, cuts a hole in the wall and retrieves the wire, which is directly therebehind, for attachment to the box. The tool may comprise an elongated heavy bar having an upwardly extending locator portion, a wire attachment element, and a device for manually releasing it from its hanging position on the top plate.

3 Claims, 5 Drawing Figures

LOCATING ARRANGEMENT FOR BUILDING WIRING INSTALLATION

BACKGROUND AND SUMMARY OF THE INVENTION

This invention relates to a locating arrangement for building wire installation.

During the construction of many buildings, the framework is first put up, the rough electrical work is done, the walls and ceiling panels are next installed, and finally the electrical trim work is done. This method of wiring the building can often be a slow and laborious process.

The present invention is directed to a unique concept of wiring wherein certain locating means are set in place while the building framework is still open, these locating means assisting in the final positioning of the wiring after the framework is closed. The concept is applicable to any building having a crawlspace above the room or rooms to be wired.

In accordance with the various aspects of the invention, when the building framework is completed and the studs and ceiling joists are exposed, the workman places a mark on the floor directly beneath where an electrical outlet box or the like is to be placed. The workman then drills a vertical hole in the horizontal top plate and directly above the floor mark. A visual locator tool is positioned in the hole so that it is hangingly supported by the top plate. The wall and ceiling panels may then be installed by other workmen.

Subsequently, the electrician enters the closed crawlspace where he can easily find the locator by visual observation. He attaches his electrical wiring to the locator and releases the latter so that it drops down from the hole by gravity, carrying the wiring with it in a generally vertical line.

The electrician then enters the room, finds the mark on the floor, measures up to where he wants the box, cuts a hole in the wall and retrieves the wire, which is directly therebehind, for attachment to the box.

The tool may comprise an elongated heavy bar having an upwardly extending locator portion, a wire attachment element, and a device for manually releasing it from its hanging position on the top plate.

BRIEF DESCRIPTION OF THE DRAWINGS

The accompanying drawings illustrate the best mode presently contemplated by the inventor for carrying out the invention.

In the drawings

DESCRIPTION OF THE PREFERRED EMBODIMENT

Figure 1:
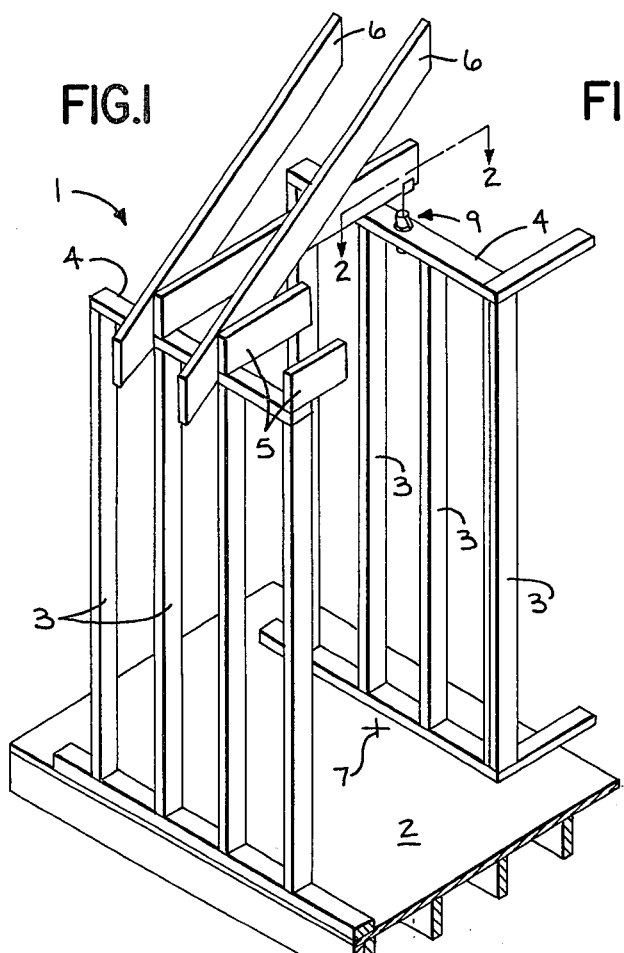
FIG. 1 is a fragmentary schematic view of a building to which the concepts of the invention may be applied, and showing the open framework as well as the floor mark and locator tool in place.

As shown in the drawings, the inventive concepts are adapted for application to a building 1 which is under construction and which has reached the point where it includes a suitably supported floor 2, together with an open framework comprising spaced vertical studs 3, horizontal top plates 4 connecting the studs, ceiling joists 5 and rafters 6.

While the framework is still open, and prior to the installation of ceiling and wall panels, a mark 7 is placed on floor 2 closely adjacent and normally between a pair of studs 3. A vertical hole 8 is then drilled in the top plate 4 generally directly above mark 7. A locator tool 9 is then positioned in hole 8 so that it is automatically held in fixed position by hanging support by top plate 4.

Figure 2:
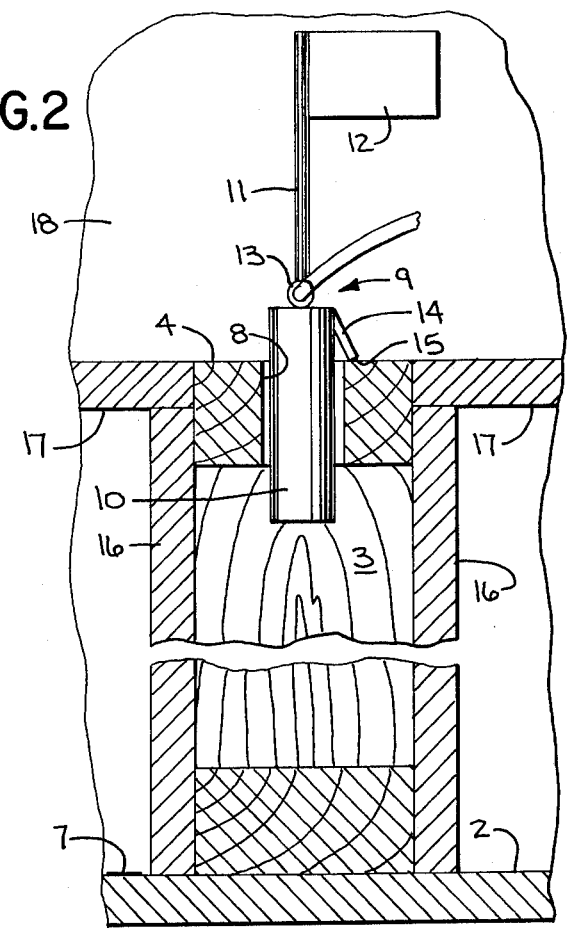
FIG. 2 is a transverse section taken on line 2—2 of FIG. 1, subsequent to application of the wall panels, and showing the details of the locator tool.

As best shown in FIG. 2, tool 9 comprises an elongated bar 10 of heavy weight, such as lead. Bar 10 is constructed to have an indicator portion extending upwardly from top plate 4 for purposes to be described. In the embodiment shown, the indicator portion comprises a thin rod 11 having a cloth flag 12 of bright color at its top. In addition, an electrical wire attachment element, shown here as a ring 13, is mounted to the upper end portion of bar 10. Furthermore, manually releasable means are provided to hang tool 9 in place. For this purpose, a leaf spring 14 is attached to bar 10 and diverges outwardly and downwardly therefrom to form a terminating latching edge 15 which normally engages the upper surface of top plate 4.

Once mark 7 has been made and locator tool 9 installed, the open framework of the building may be closed as by wall panels 16, as well as ceiling panels 17 which together with the enclosed roof forms an attic or crawlspace 18. See FIG. 2.

Figure 3:
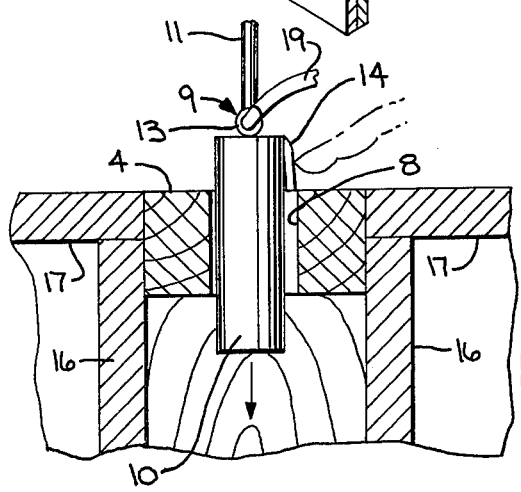
FIG. 3 is a view showing application of a wire to and manual release of the tool.

After the building is enclosed, the electrician enters crawlspace 18 and looks for the one or more locator tools 9, which should be easily visible, even in dim light, due to the flag 12. An electric wire 19 is suitably attached to ring 13, as in FIG. 3, and tool 9 is released from hanging engagement with top plate 4, as by manually pressing spring 14 against the body of bar 10 to permit the latter to drop downwardly by gravity toward mark 7, carrying wire 19 with it. The electrician may then leave crawlspace 18 and re-enter the room.

Figure 4:
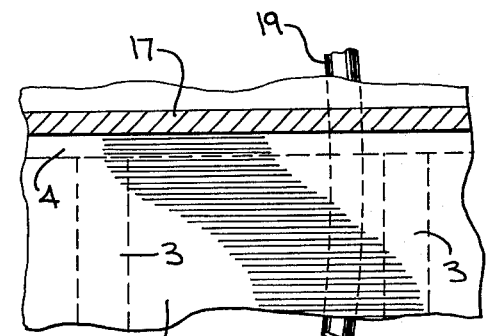
FIG. 4 is a view showing an outlet opening cut in the wall and the position of the tool and wire for retrieval.
Figure 4:
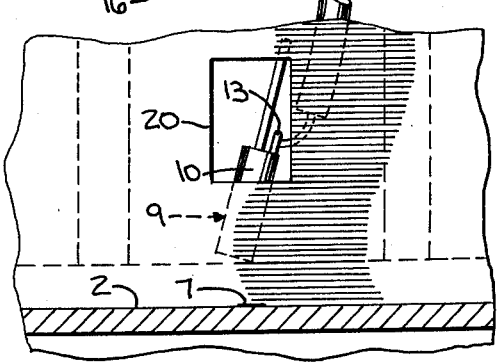
Figure 5:
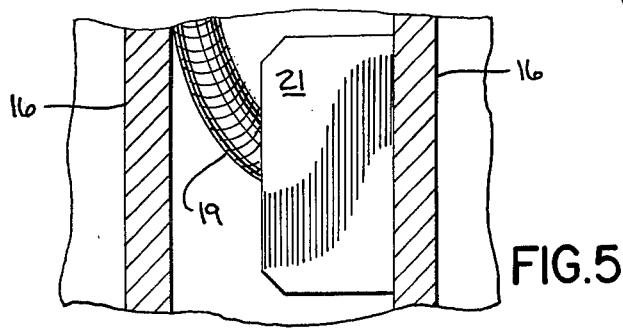
FIG. 5 is a side view showing the installed outlet box.

Even though wall panel 16 completely covers tool 9 and wire 19 so that they are not visible, the dropped position thereof is known, due to mark 7 on floor 2. A suitable opening 20 is then cut vertically above mark 7 at the height desired for installation of an outlet or the like. See FIG. 4. After opening 20 is cut, wire 19 should be found exposed substantially directly behind the opening in the chaseway between the pair of studs 3, and can easily be retrieved together with tool 9. Wire 19 is then suitably attached to an outlet box 21 which is then attached to wall panel 16, as shown in FIG. 5.

Clearly, more than one floor mark 7 and locator tool 9 may be positioned prior to enclosing the building framework so that many outlets can be installed quickly after the room or other area is enclosed.

The concepts of the invention provide a unique system for wiring a building which is believed to be faster and more efficient than previous systems. The tool of the present embodiment, while quite simple, is highly useful in enhancing the operativeness of the entire system.

Various modes of carrying out the invention are contemplated as being within the scope of the following claims particularly pointing out and distinctly claiming the subject matter which is regarded as the invention.

I claim:

1. The method of installing electrical wiring in a building under construction wherein the building provides areas having a floor and an open framework including spaced vertical studs with connecting horizontal top plates, comprising the steps of:
   (a) marking the floor with a mark disposed generally vertically below where an outlet box or the like is to ultimately be positioned and between a pair of studs,
   (b) forming a hole in a top plate substantially vertically above said mark,
   (c) providing a locator tool having an indicator portion and hanging said tool from said top plate and within said hole so that said indicator portion extends above said top plate,
   (d) then enclosing said framework with wall and ceiling panels with the latter forming a crawlspace thereabove,
   (e) locating the indicator portion of said tool in said crawlspace and connecting an electric wire to said tool,
   (f) releasing said tool from said top plate so that the tool and connected wire drop generally vertically downwardly by gravity through said hole and toward said mark,
   (g) cutting an opening in a said wall panel at a desired height and generally directly above said floor mark to expose said dropped wire and retrieving said wire therethrough,
   (h) and finally connecting said wire to an outlet box or the like for installation at said opening.

2. The method of installing electrical wiring in a building under construction wherein the building provides areas having a floor and an open framework including spaced vertical studs with connecting horizontal top plates, comprising the steps of:
   (a) marking the floor with a mark disposed generally vertically below where an oulet box or the like is to ultimately be positioned and between a pair of studs,
   (b) forming a hole in a top plate substantially vertically above said mark,
   (c) providing a locator tool comprising:
      (1) an elongated heavy bar,
      (2) an indicator portion extending upwardly from said bar,
      (3) wire connecting means disposed on said bar,
      (4) and spring means attached to said bar and diverging outwardly and downwardly therefrom to form a terminating latching edge,
   (d) hanging said locator tool from said top plate so that said bar is disposed within said hole, said indicator portion extends above said top plate, and said edge of said spring means engages the top surface of said top plate,
   (e) then enclosing said framework with wall and ceiling panels with the latter forming a crawlspace thereabove,
   (f) locating the indicator portion of said tool in said crawlspace and connecting an electric wire to said wire connecting means of said tool,
   (g) pressing said spring means against the body of said bar to thereby release said tool from said top plate so that the tool and connected wire drop generally vertically downwardly by gravity through said hole and toward said mark,
   (h) cutting an opening in a said wall panel at a desired height and generally directly above said floor mark to expose said dropped wire and retrieving said wire therethrough,
   (i) and finally connecting said wire to an outlet box or the like for installation at said opening.

3. A locator tool for use in the method of claim 1 comprising:
   (a) an elongated heavy bar for disposal in said hole formed in said top plate,
   (b) said indicator portion extending upwardly from said bar,
   (c) wire connecting means disposed on said bar,
   (d) and spring means attached to said bar and diverging outwardly and downwardly therefrom to form a terminating latching edge which engages the upper surface of said top plate to hold said bar in said hole,
   (e) said spring means being manually pressable against the body of said bar to form means to release the latter from said hole for gravity fall downwardly therefrom.

* * * * *